(12) United States Patent
Miyachi et al.

(10) Patent No.: US 10,626,762 B2
(45) Date of Patent: Apr. 21, 2020

(54) VALVE OPENING/CLOSING TIMING CONTROL DEVICE

(71) Applicant: AISIN SEIKI KABUSHIKI KAISHA, Kariya-shi, Aichi (JP)

(72) Inventors: Eiji Miyachi, Nishio (JP); Hiroki Mukaide, Chiryu (JP)

(73) Assignee: AISIN SEKI KABUSHIKI KAISHA, Kariya-Shi, Aichi (JP)

( * ) Notice: Subject to any disclaimer, the term of this patent is extended or adjusted under 35 U.S.C. 154(b) by 0 days.

(21) Appl. No.: 16/349,485

(22) PCT Filed: Sep. 4, 2017

(86) PCT No.: PCT/JP2017/031686
§ 371 (c)(1),
(2) Date: May 13, 2019

(87) PCT Pub. No.: WO2018/092390
PCT Pub. Date: May 24, 2018

(65) Prior Publication Data
US 2019/0292952 A1    Sep. 26, 2019

(30) Foreign Application Priority Data

Nov. 18, 2016 (JP) .................. 2016-224831
Jun. 20, 2017 (JP) .................. 2017-120329

(51) Int. Cl.
*F01L 1/34*    (2006.01)
*F01L 1/352*   (2006.01)
(Continued)

(52) U.S. Cl.
CPC .............. *F01L 1/352* (2013.01); *F01L 1/047* (2013.01); *F01M 9/108* (2013.01); *F16H 1/32* (2013.01)

(58) Field of Classification Search
CPC .. F01L 1/047; F01L 1/352; F16H 1/32; F01M 9/108
See application file for complete search history.

(56) References Cited

U.S. PATENT DOCUMENTS

| 2014/0216202 A1* | 8/2014 | Tadokoro ............... F16H 25/10 74/568 R |
| 2017/0138228 A1 | 5/2017 | Miyachi et al. |
| 2018/0371964 A1 | 12/2018 | Miyachi |

FOREIGN PATENT DOCUMENTS

| JP | 2008248804 A | 10/2008 |
| JP | 2016044627 A | 4/2016 |

OTHER PUBLICATIONS

International Search Report (with English translation) and Written Opinion issued in corresponding International Patent Application No. PCT/JP2017/031686, 7 pages (dated Nov. 10, 2017.

* cited by examiner

*Primary Examiner* — Zelalem Eshete
(74) *Attorney, Agent, or Firm* — Buchanan Ingersoll & Rooney PC (57) ABSTRACT

A valve opening/closing timing control device that sets a relative rotation phase between a driving-side rotating body and a driven-side rotating body using a driving force of an electric actuator is compactly configured. The device is provided with: a first bearing disposed between an inner periphery of the driven-side rotating body and an eccentric member; a second bearing disposed between the eccentric member and an input gear on a side of the first bearing away from a camshaft in a direction along a rotational axis; and a front plate fixed to the driving-side rotating body on a side of the second bearing away from the camshaft. An Oldham (Continued)

coupling is disposed on the side away from the camshaft of both the first bearing and the second bearing in the direction along the rotational axis.

5 Claims, 8 Drawing Sheets

(51) Int. Cl.
*F16H 1/32* (2006.01)
*F01L 1/047* (2006.01)
*F01M 9/10* (2006.01)

VALVE OPENING/CLOSING TIMING CONTROL DEVICE

TECHNICAL FIELD

The present invention relates to a valve opening/closing timing control device that sets a relative rotation phase between a driving-side rotating body and a driven-side rotating body using a driving force of an electric actuator.

BACKGROUND ART

In a valve opening/closing timing control device disclosed in Patent Document 1, a sun gear is provided in a driving-side rotating body, a planetary carrier that is driven to rotate by an electric motor is provided, a planetary gear that is externally fitted to an eccentric portion of the planetary carrier through a bearing is provided, and a structure that links the planetary gear to the driven-side rotating body is provided. Thus there is disclosed a technique whereby the relative rotational attitude between the driving-side rotating body and the driven-side rotating body is set at a large reduction ratio.

The valve opening/closing timing control device of Patent Document 1 has a structure in which the planetary gear rotates around an eccentric axis that is offset from the rotational axis of the sun gear, and therefore, this device is provided with a transmission structure in which a plurality of engaging projections are formed in the planetary gear, and engaging holes where the engaging projections engage are formed in a guiding rotating body.

Also, in a valve opening/closing timing control device disclosed in Patent Document 2, an inner gear that is capable of rotating through a bearing is provided on the outside of an eccentric ring, an inner teeth type ring gear that engages with teeth of part of the inner gear is provided in the driven-side rotating body, and an Oldham coupling that transmits rotation of the inner gear to a front case of the driving-side rotating body is provided.

PRIOR ART DOCUMENTS

Patent Documents

Patent Document 1: JP 2008-248804A
Patent Document 2: JP 2016-44627A

OVERVIEW OF INVENTION

Problem to be Solved by Invention

However, there are demands for the valve opening/closing timing control devices in Patent Documents 1 and 2 to be made more compact because these devices have large dimensions in a direction along a rotational axis. That is, in Patent Documents 1 and 2, within the valve opening/closing timing control device, part of a member (a cover member in the case of Document 1, and the front case in the case of Document 2) disposed on the opposite side as a camshaft is expanded outward, and an outer end side of the eccentric member (the planetary carrier in the case of Document 1, and the eccentric ring in the case of Document 2) is supported through a bearing at the location thus expanded. This leads to an increase in the size of the valve opening/closing timing control device.

Also, taking the valve opening/closing timing control device of Patent Document 2 as an example, the bearing is disposed on the front case side, so a load that acts on the front case is increased. Therefore, the strength of the front case is increased, and this also leads to an increase in the size of the valve opening/closing timing control device.

Furthermore, in the valve opening/closing timing control devices of Patent Documents 1 and 2, a large load acts on the gears, so supply of lubricating oil is desired from the viewpoints of, in addition to the objective of realizing smooth operation, suppressing wear of tooth surfaces and the like, and discharging internal foreign matter and the like.

For such reasons, there are demands to compactly configure a valve opening/closing timing control device that sets a relative rotation phase between a driving-side rotating body and a driven-side rotating body using a driving force of an electric actuator, while allowing the valve opening/closing timing control device to operate smoothly.

Means for Solving Problem

In a characteristic configuration, the present invention includes:

a driving-side rotating body that rotates in synchronization with a crankshaft of an internal combustion engine around a rotational axis;

a driven-side rotating body disposed inside of the driving-side rotating body on the same axis as the rotational axis, the driven-side rotating body rotating as a single body together with a valve opening/closing camshaft of the internal combustion engine; and a phase adjustment mechanism that sets a relative rotation phase between the driving-side rotating body and the driven-side rotating body using a driving force of an electric actuator;

wherein the phase adjustment mechanism is provided with an output gear provided in the driven-side rotating body on the same axis as the rotational axis, an input gear that rotates on an eccentric axis having an attitude parallel to the rotational axis, has fewer teeth than the output gear, and is disposed on the same axis as the eccentric axis, the input gear configured to couple to the driving-side rotating body through an Oldham coupling, and a cylindrically-shaped eccentric member that supports the input gear inside of the input gear so as to allow the input gear to rotate around the eccentric axis, the phase adjustment mechanism thereby changing a position where the output gear and the input gear engage with each other by causing the eccentric axis to revolve with rotation of the eccentric member due to driving force of the electric actuator, and the characteristic configuration is provided with a first bearing disposed between an inner periphery of the driven-side rotating body and an outer periphery of the eccentric member, a second bearing disposed between the outer periphery of the eccentric member and the inner periphery of the input gear on a side of the first bearing away from the camshaft in a direction along the rotational axis, and a front plate fixed to the driving-side rotating body on a side of the second bearing away from the camshaft in the direction along the rotational axis, the Oldham coupling being disposed on the side away from the camshaft of both the first bearing and the second bearing in the direction along the rotational axis.

According to this characteristic configuration, because the first bearing is provided on the driven-side rotating body having high strength, the thickness of the front plate can be reduced, and the dimensions in the direction along the rotational axis can be shortened. Also, because the first bearing, the second bearing, the Oldham coupling, and the front plate can be disposed comparatively close to each other in the direction along the rotational axis, the rotational moment can be effectively received by the first bearing and the second bearing. As a result, the rotational attitude of the eccentric member and the input gear is stabilized, and operation can be performed smoothly. Also, because the Oldham coupling is disposed at a position where it is possible to contact the inner face of the front plate on the side of the second bearing away from the camshaft, a configuration for supporting the second bearing on the front plate does not have to be adopted. As a result, it is possible to further shorten the dimensions in the direction along the rotational axis.

Accordingly, a valve opening/closing timing control device that sets the relative rotation phase between the driving-side rotating body and the driven-side rotating body using the driving force of the electric actuator is compactly configured in a state that allows the valve opening/closing timing control device to operate smoothly.

Another configuration may be adopted in which the Oldham coupling is disposed between the front plate and the second bearing, and in the eccentric member, a lubricating oil groove that guides lubricating oil supplied to an internal space to the outside in the radial direction is formed inside relative to the front plate, at an end on the side away from the camshaft in the direction along the rotational axis.

According to this configuration, the lubricating oil supplied to the internal space of the eccentric member is sent to the outside from the lubricating oil groove of the eccentric member by centrifugal force accompanying rotation of the valve opening/closing timing control device, and the lubricating oil is ultimately discharged. Therefore, for example, dust and foreign matter and the like generated inside can be discharged together with the lubricating oil. Also, it becomes possible to dispose the Oldham coupling in contact with the front plate, and the lubricating oil groove is formed inside relative to the front plate of the eccentric member, so even when the Oldham coupling and the front plate are disposed with a positional relationship in contact with each other, lubricating oil is supplied between the Oldham coupling and the front plate to achieve smooth operation of the Oldham coupling.

Another configuration may be adopted in which the Oldham coupling is disposed between the front plate and the second bearing, and a notch-like discharge channel that allows lubricating oil to flow through to the side of the outer periphery at the location where the Oldham coupling engages is formed in the driving-side rotating body.

Even when the Oldham coupling and the front plate are disposed with a positional relationship in contact with each other, lubricating oil is supplied between the Oldham coupling and the front plate to achieve smooth operation of the Oldham coupling. Also, because the notch-like discharge path is formed in the driving-side rotating body, the discharge path can easily be formed. In this configuration, lubricating oil that remains inside the valve opening/closing timing control device can be discharged by the discharge channel when the internal combustion engine is started. For example, even when the internal combustion engine is in a low temperature state and the viscosity of the lubricating oil is high, the lubricating oil is quickly discharged, enabling smooth operation of the phase adjustment mechanism.

Another configuration may be adopted in which a first biasing member, causing biasing force to act on the input gear such that part of the input gear engages with part of the output gear, is provided between the outer periphery side of the eccentric member and the inner periphery side of the second bearing, the Oldham coupling is disposed between the front plate and the second bearing, and a second biasing member that biases the second bearing toward the first bearing is provided between the Oldham coupling and the second bearing.

In this configuration, the first biasing member, causing biasing force to act on the input gear such that part of the input gear on the side of the driving-side rotating body engages with part of the output gear on the side of the driven-side rotating body, is provided between the outer periphery side of the eccentric member and the inner periphery side of the second bearing. Also, the Oldham coupling is disposed between the front plate and the second bearing. In the valve opening/closing timing control device, ordinarily, from the viewpoint of ease of assembly of members, the input gear and the second bearing that face the Oldham coupling are disposed having a gap where movement is allowed in the direction along the rotational axis. In this sort of configuration, for example, when an external force acts on the driven-side rotating body connected to the camshaft when torque fluctuation is applied during operation of the internal combustion engine, the external force is transmitted from the inner teeth of the output gear to the outer teeth of the input gear. In this case, the input gear, to which the external force has been transmitted, moves in the range of the gap in the direction along the rotational axis, and also moves in a direction (a direction toward the rotational axis) resisting the biasing force of the first biasing member. Also, the second bearing also moves in the range of the gap in the direction along the rotational axis, and moves in the direction (the direction toward the rotational axis) resisting the biasing force of the first biasing member. In this way, because the input gear and the second bearing move in two directions inside the driven-side rotating body, they may have an attitude inclined relative to the direction along the rotational axis. When this happens, corner portions of the input gear and the second bearing come into contact with peripheral members, and therefore there is a risk of wear on the input gear and the second bearing, and on the peripheral members.

Consequently, in this configuration, the second biasing member that biases the second bearing toward the first bearing is provided between the Oldham coupling and the second bearing. The second bearing is biased toward the first bearing by the biasing member and held on the side of the first bearing, and therefore the second bearing is difficult to move in the direction along the rotational axis. As a result, the position of the second bearing in the direction along the rotational axis, and the attitude of the second bearing, are stable. Because the input gear is supported by the second bearing whose position and attitude are maintained, the attitude of the input gear is stable. Further, by stabilizing the position and attitude of the second bearing, the frictional force between the inner peripheral face of the second bearing and the outer peripheral face of the eccentric member is increased. As a result, when the input gear and the second bearing have moved in the direction (the direction toward the rotational axis) resisting the biasing force of the first biasing member, the inner peripheral side of the second bearing and the outer peripheral face of the eccentric member come into face contact. Thus, by stabilizing the position and attitude of the second bearing, the attitude of other members that contact the second bearing is stable. As a result, the input gear and the second bearing come into face contact with peripheral members, which makes them less likely wear, thereby improving durability.

Another configuration may be adopted in which a first biasing member, causing biasing force to act on the input gear such that part of the input gear engages with part of the output gear, is provided between the outer periphery side of the eccentric member and the inner periphery side of the second bearing, the Oldham coupling is disposed between the front plate and the second bearing, and a spacer, which sets a distance of a gap in which the second bearing can move in the direction along the rotational axis to no more than a predetermined set value, is provided between the Oldham coupling and the second bearing.

In this configuration, movement of the second bearing in the direction along the rotational axis is limited to no more than the predetermined set value by the spacer provided between the Oldham coupling and the second bearing. As a result, the position of the second bearing in the direction along the rotational axis, and the attitude of the second bearing, are stable. Because the input gear is supported by the second bearing, which has small changes in position in the direction along the rotational axis and small changes in attitude, the attitude of the input gear is stabilized. Also, by stabilizing the position and attitude of the second bearing, the frictional force between the inner peripheral face of the second bearing and the outer peripheral face of the eccentric member is increased. As a result, in this embodiment as well, the input gear and the second bearing come into face contact with peripheral members, which makes them less likely wear, thereby improving durability.

MODE FOR CARRYING OUT THE INVENTION

Figure 1:
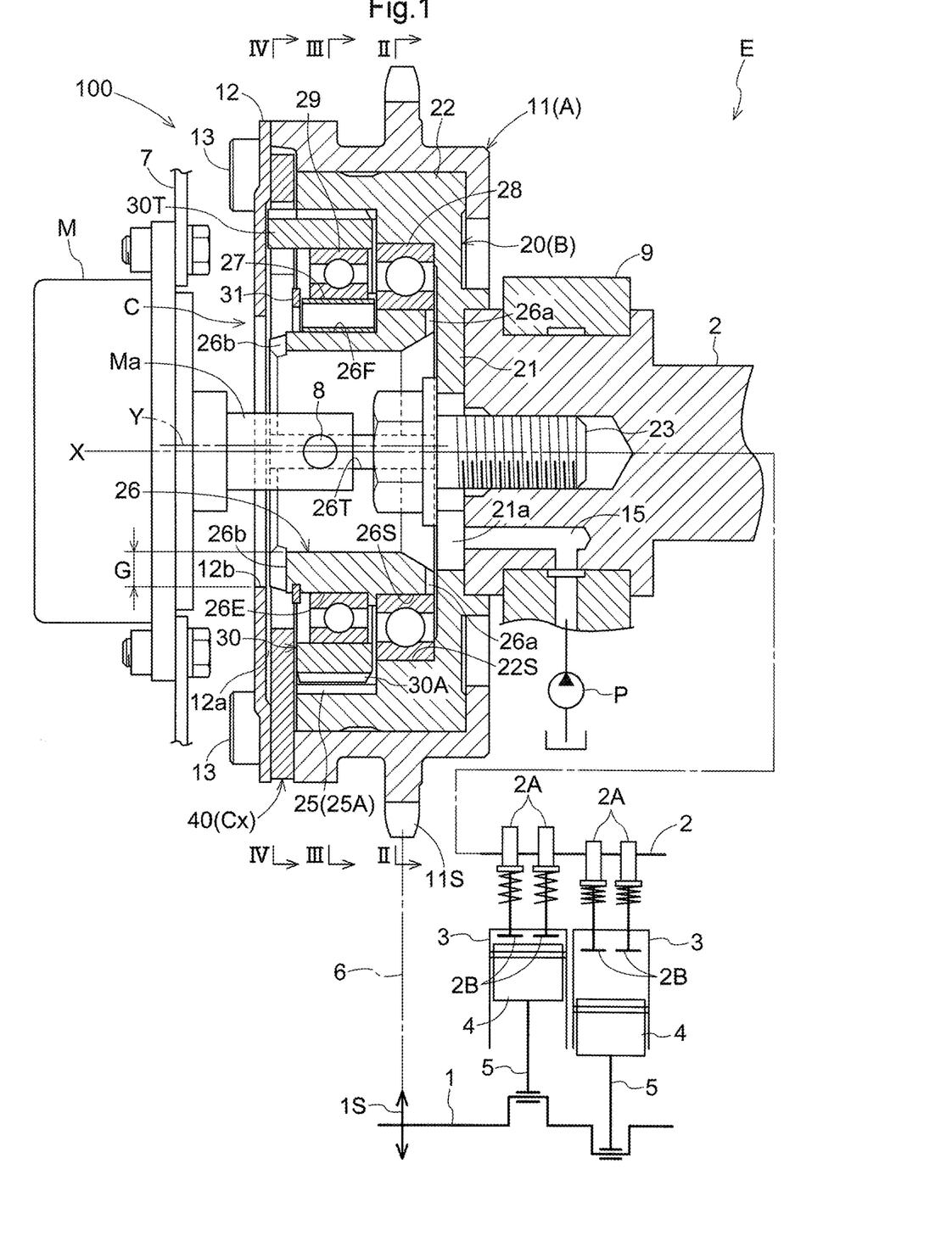
FIG. 1 is a cross-sectional view of a valve opening/closing timing control device.

Embodiments of the present invention will be described below with reference to the drawings.
Basic Configuration As shown in FIG. 1, a valve opening/closing timing control device 100 is configured to include a driving-side rotating body A that rotates in synchronization with a crankshaft 1 of an engine E serving as an internal combustion engine, a driven-side rotating body B that rotates as a single body together with an intake camshaft 2 around a rotational axis X, and a phase adjustment mechanism C that sets the relative rotation phase between the driving-side rotating body A and the driven-side rotating body B using driving force of a phase control motor M (an example of an electric actuator).

The engine E is configured as a four cycle type engine in which pistons 4 are accommodated in a plurality of cylinders 3 formed in a cylinder block, and each piston 4 is connected to the crankshaft 1 by a connecting rod 5. A timing chain 6 (or a timing belt or the like) is wound around an output sprocket 1S of the crankshaft 1 of the engine E, and a drive sprocket 11S of the driving-side rotating body A.

Thus, when the engine E is operating, the entire valve opening/closing timing control device 100 rotates around the rotational axis X. Also, by operating the phase adjustment mechanism C using the driving force of the phase control motor M, the driven-side rotating body B can be displaced in the same direction or in the opposite direction as the rotation direction of the driving-side rotating body A. The relative rotation phase between the driving-side rotating body A and the driven-side rotating body B is set by the displacement of the phase adjustment mechanism C, and thus control of the opening/closing period (opening/closing timing) of an intake valve 2B by a cam portion 2A of the intake camshaft 2 is realized.

An operation in which the driven-side rotating body B is displaced in the same direction as the rotation direction of the driving-side rotating body A is referred to as an advancing operation, and an intake compression ratio is increased by this advancing operation. An operation in which the driven-side rotating body B is displaced in the opposite direction as the driving side rotating body A (an operation in the opposite direction as the above-described direction) is referred to as a retarding operation, and the intake compression ratio is increased by this retarding operation.

Valve Opening/Closing Timing Control Device

As shown in FIGS. 1 to 4, the driving-side rotating body A is configured by fastening an outer case 11, which has the drive sprocket 11S formed on its outer periphery, to a front plate 12 with a plurality of fastening bolts 13. The outer case 11 is a cylindrically shaped case having a bottom, and with an opening in the bottom.

An intermediate member 20 serving as the driven side rotating body B and the phase adjustment mechanism C having a hypocycloid-type gear reduction mechanism are accommodated in the internal space of the outer case 11. In addition, the phase adjustment mechanism C includes an Oldham coupling Cx that reflects a phase change in the driving-side rotating body A and the driven-side rotating body B.

In the intermediate member 20 constituting the driven-side rotating body B, a support wall 21 connected to the intake camshaft 2 in an attitude orthogonal to the rotational axis X, and a cylindrical wall 22 that has a cylindrical shape centered on the rotational axis X and protrudes in a direction separating from the intake crankshaft 2, are formed as a single body.

The intermediate member 20 is engaged in a manner capable of relative rotation in a state where the outer face of the cylindrical wall 22 contacts the inner face of the outer case 11, and is fixed to an end of the intake crankshaft 2 by a connecting bolt 23 inserted through a through-hole in the center of the support wall 21. The intermediate member 20 is configured such that, in a state fixed in this way, an end of the cylindrical wall portion 22 on the outer side (the side away from the intake camshaft 2) is positioned to the inside relative to the front plate 12.

The phase control motor M (an electric motor) is supported on the engine E by a support frame 7 such that an output shaft Ma of the phase control motor M is disposed on the same axis as the rotational axis X. A pair of engaging pins 8 in an attitude orthogonal to the rotational axis X are formed in the output shaft Ma of the phase control motor M.

Phase Adjustment Mechanism

As shown in FIGS. 1 to 5, the phase adjustment mechanism C includes the intermediate member 20, an output gear 25 formed on the inner peripheral face of the cylindrical wall 22 of the intermediate member 20, an eccentric member 26, a spring body 27 serving as a first biasing member, a first bearing 28, a second bearing 29, an input gear 30, a fixing ring 31, and the Oldham coupling Cx. Note that although ball bearings are used for the first bearing 28 and the second bearing 29, it is also possible to use a bushing.

Figure 5:
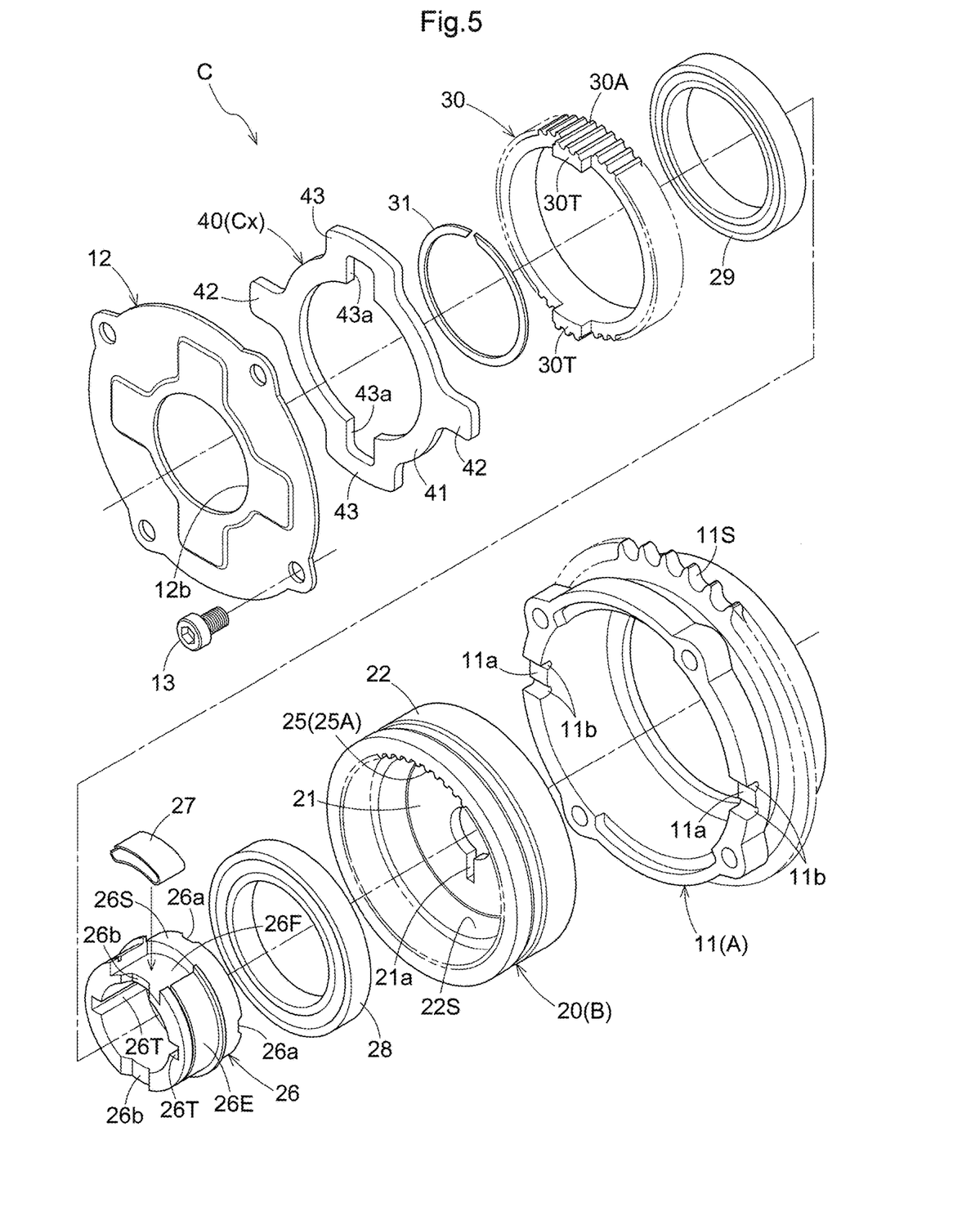
FIG. 5 is an exploded perspective view of the valve opening/closing timing control device.

In the inner periphery of the cylindrical wall 22 of the intermediate member 20, a support face 22S centered on the rotational axis X is formed inside (at a position adjacent to the support wall 21) in a direction along the rotational axis X, and the output gear 25 centered on the rotational axis X is formed outside (the side away from the intake crankshaft 2) relative to the support face 22S, the support face 22S and the output gear 25 being formed together as a single body.

The eccentric member 26 has a cylindrical shape, and in the eccentric member 26, a circumferential support face 26S of an outer peripheral face centered on the rotational axis X is formed inside (the side nearer to the intake camshaft 2) in the direction along the rotational axis X, and an eccentric support face 26E of an outer peripheral face centered on an eccentric axis Y that is eccentric in an attitude parallel to the rotational axis X is formed outside (the side away from the intake camshaft 2). The spring body 27 is fitted into a recessed portion 26F formed at the outer periphery of the eccentric support face 26E.

At the inner periphery of the eccentric member 26, a pair of engaging grooves 26T capable of engaging with each pair of engaging pins 8 of the phase control motor M are formed in an attitude parallel to the rotational axis X. Further, a plurality of first lubricating oil grooves 26*a* in an attitude along the radial direction are formed on the inside (the side of the support wall 21) of the eccentric member 26, and a plurality of second lubricating oil grooves 26*b* in an attitude along the radial direction are formed on the outside (the side away from the intake camshaft 2). Note that a configuration may also be adopted in which only one of the first lubricating oil groove 26*a* and the second lubricating oil groove 26*b* is formed in the eccentric member 26. The quantity of the first lubricating oil grooves 26*a* and the second lubricating oil grooves 26*b* may be set arbitrarily.

Figure 2:
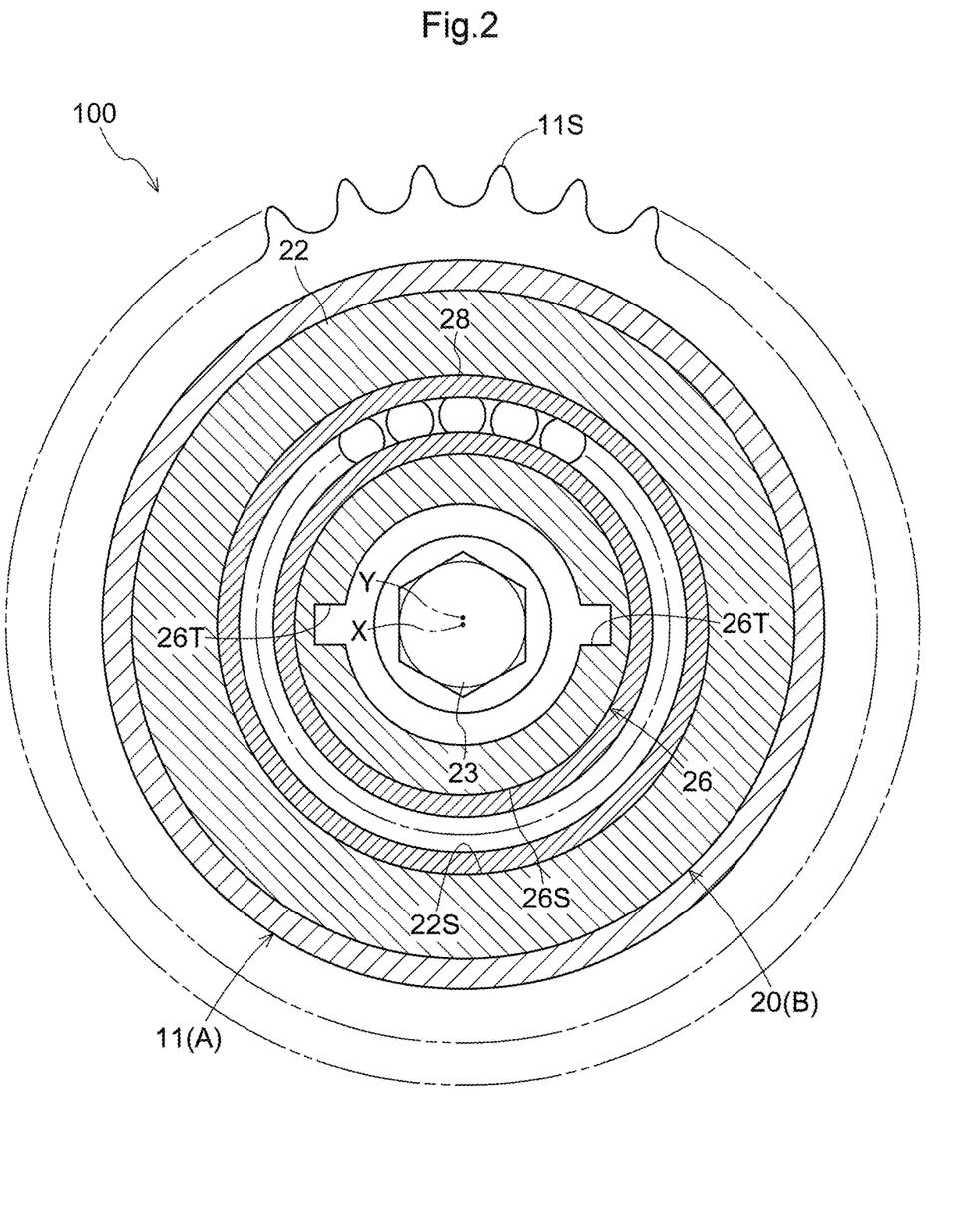
FIG. 2 is a cross-sectional view taken along line II-II in FIG. 1.
Figure 3:
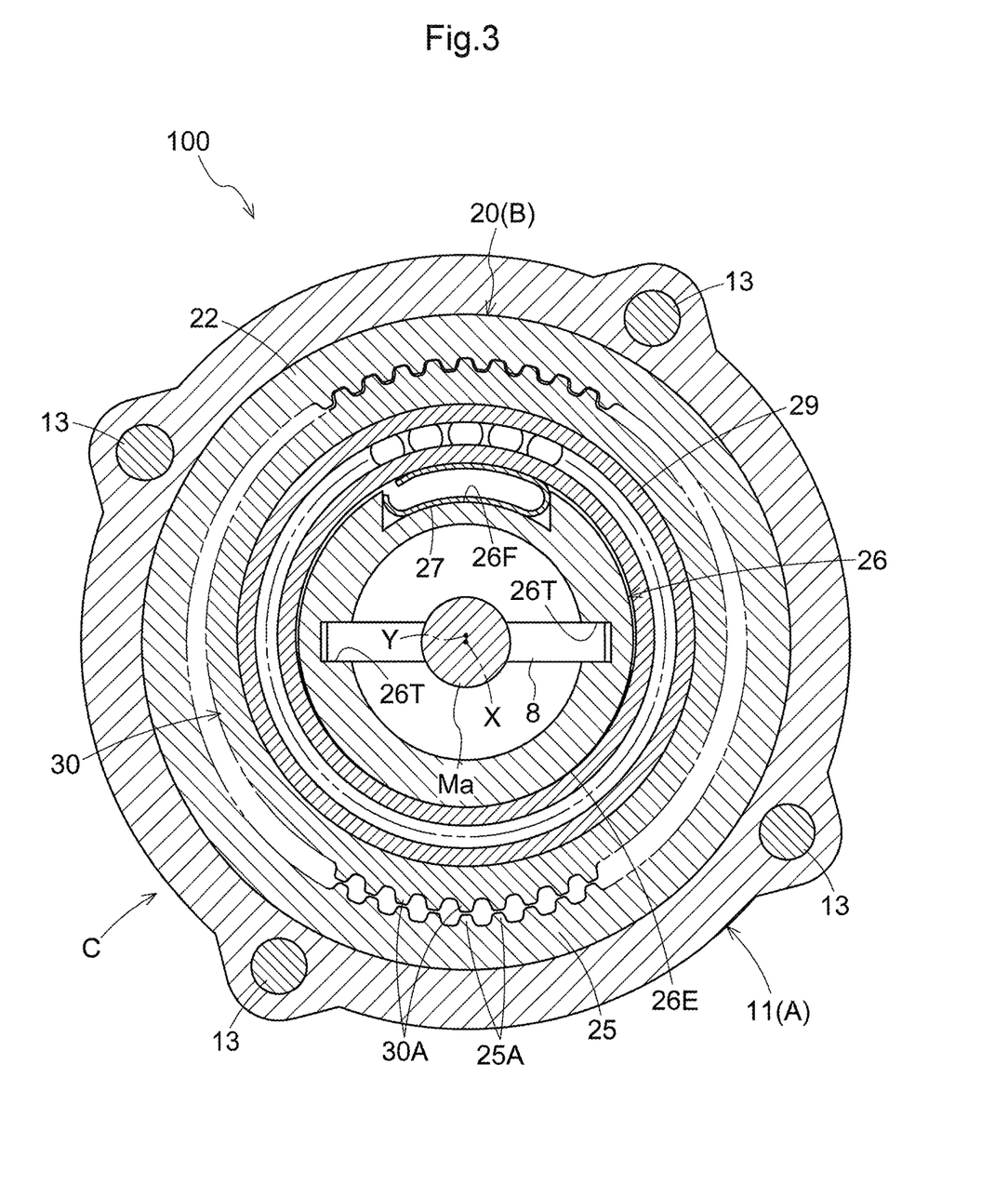
FIG. 3 is a cross-sectional view taken along line III-III in FIG. 1.

As shown in FIGS. 1 and 2, the eccentric member 26 has the first bearing 28 externally fitted to the circumferential support face 26S, and the first bearing 28 is fitted to the support face 22S of the cylindrical wall 22. Thus, the intermediate member 20 is rotatably supported centered on the rotational axis X. Further, as shown in FIGS. 1 and 3, the input gear 30 is rotatably supported, centered on the eccentric axis Y, on the eccentric support face 26E of the eccentric member 26 through the second bearing 29.

In the phase adjustment mechanism C, the number of teeth of an outer teeth portion 30A of the input gear 30 is set to be one less than the number of teeth of an inner teeth portion 25A of the output gear 25. Part of the outer teeth portion 30A of the input gear 30 engages with part of the inner teeth portion 25A of the output gear 25.

The spring body 27 has a shape in which a spring plate material is bent in a U-shape, and applies a biasing force to the input gear 30 such that part of the outer teeth portion 30A of the input gear 30 is caused to engage with part of the inner teeth portion 25A of the output gear 25. Also, the fixing ring 31 prevents the second bearing 29 from detaching by being supported in a fitted state on the outer periphery of the eccentric member 26.

Phase Adjustment Mechanism: Oldham Coupling

Figure 4:
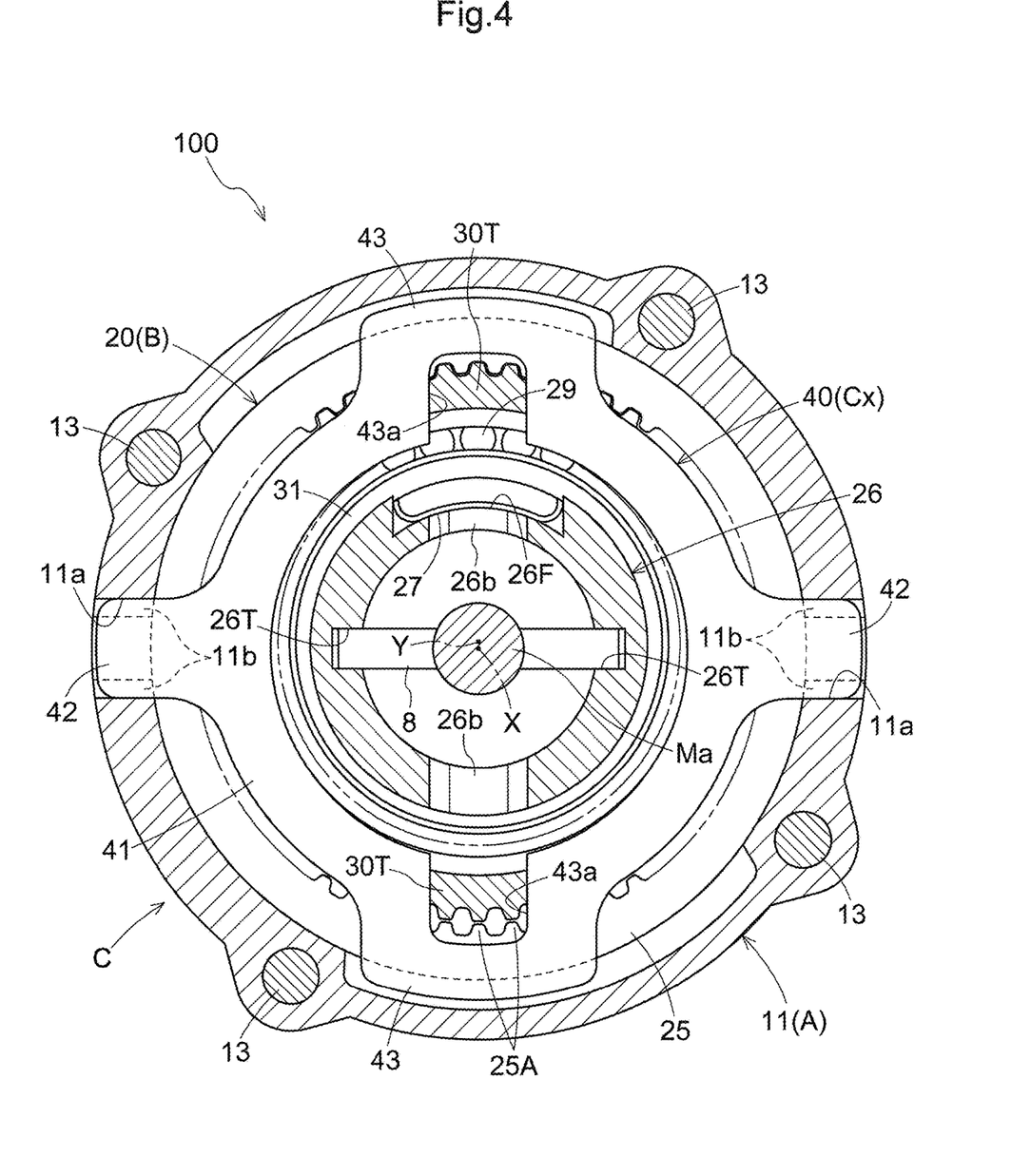
FIG. 4 is a cross-sectional view taken along line IV-IV in FIG. 1.

As shown in FIGS. 1, 4 and 5, the Oldham coupling Cx is configured with a plate-like coupling member 40, in which there are formed, together as a single body, a center annular portion 41, a pair of outer engaging arms 42 that protrude outward in the radial direction along a first direction (the left-right direction in FIG. 4) from the annular portion 41, and inner engaging arms 43 that protrude outward in the radial direction along a direction (the up-down direction in FIG. 4) orthogonal to the first direction from the annular portion 41. An engaging recessed portion 43*a* extending to an opening of the annular portion 41 is formed in each of the pair of inner engaging arms 43.

In the outer case 11, a pair of guide groove portions 11*a* that extend in the radial direction centered on the rotational axis X are formed as through-grooves at an opening edge portion where the front plate 12 makes contact, spanning from the inner space to the outer space of the outer case 11. The groove width of the guide groove portions 11*a* is set to be slightly greater than the width of the outer engaging arms 42, and a pair of discharge channels 11*b* are formed notched out from each of the guide groove portions 11*a*. Note that the discharge channels 11*b* may be formed such that lubricating oil flows in the radial direction relative to the front plate 12.

Also, in the input gear 30, a pair of engaging projections 30T are formed integrated as a single body together with the end face that faces the front plate 12. The engaging width of the engaging projections 30T is set to be slightly less than the engaging width of the engaging recessed portions 43*a* of the inner engaging arms 43.

With such a configuration, by engaging the pair of outer engaging arms 42 of the coupling member 40 with the pair of guide groove portions 11*a* of the outer case 11, and engaging the pair of engaging projections 30T of the input gear 30 with the engaging recessed portions 43*a* of the pair of inner engaging arms 43 of the coupling member 40, it is possible to allow the plate-like coupling member 40 to function as the Oldham coupling Cx.

Note that the coupling member 40 can be displaced in the first direction (the left-right direction in FIG. 4) in which the external engaging arms 42 extend relative to the outer case 11, and the input gear 30 can be displaced in a second direction (the up-down direction in FIG. 4) along the direction of formation of the engaging recessed portions 43*a* of the inner engaging arms 43 relative to the coupling member 40.

Disposition of Each Part of Valve Opening/Closing Timing Control Device

As shown in FIG. 1, in the valve opening/closing timing control device 100 in an assembled state, the support wall 21 of the intermediate member 20 is connected to the end of the intake camshaft 2 by the connecting bolt 23, and these rotate together as a single body. The eccentric member 26 is supported by the first bearing 28 so as to be capable of rotating around the rotational axis X relative to the intermediate member 20. As shown in FIGS. 1 and 2, the input gear 30 is supported on the eccentric support face 26E of the eccentric member 26 through the second bearing 29, and part of the outer teeth portion 30A of the input gear 30 engages with part of the inner teeth portion 25A of the output gear 25.

Also, as shown in FIG. 4, the outer engaging arms 42 of the Oldham coupling Cx engage with the pair of guide groove portions 11*a* of the outer case 11, and the engaging projections 30T of the input gear 30 engage with the engaging recessed portions 43*a* of the inner engaging arms 43 of the Oldham coupling Cx. As shown in FIG. 1, the front plate 12 is disposed on the outer side of the coupling member 40 of the Oldham coupling Cx, so the coupling member 40 is capable of moving in the direction orthogonal to the rotational axis X in a state of contact with the inner face of the front plate 12. With this sort of disposition, the Oldham coupling Cx is disposed outside (the side away from the intake camshaft 2) relative to both the first bearing 28 and the second bearing 29, and is disposed inside (the side nearer to the intake crankshaft 2) relative to the front plate 12.

Also, as shown in FIGS. 1 to 3, the pair of engaging pins 8 formed in the output shaft Ma of the phase control motor M engage with the engaging grooves 26T of the eccentric member 26.

Operation Mode of Phase Adjustment Mechanism

Although not shown in the drawings, the phase control motor M is controlled by a control device configured as an ECU. The engine E is provided with sensors capable of detecting the rotational speed (rotations per unit time) of the crankshaft 1 and the intake camshaft 2, and their respective rotation phases, and detection signals of these sensors are input to the control device.

The control device maintains the relative rotation phase by driving the phase control motor M at the same speed as the rotational speed of the intake camshaft 2 when the engine E is operating. On the other hand, the advancing operation is performed by decreasing the rotational speed of the phase control motor M relative to the rotational speed of the intake camshaft 2, and conversely, the retarding operation is performed by increasing the rotational speed. As described above, the intake compression ratio is increased by the advancing operation, and the intake compression ratio is decreased by the retarding operation.

When the phase control motor M rotates at the same speed as the outer case 11 (at the same speed as the intake camshaft 2), the location where the outer teeth portion 30A of the input gear 30 engages with the inner teeth portion 25A of the output gear 25 does not change. Therefore, the relative rotation phase of the driven-side rotating body B relative to the driving-side rotating body A is maintained.

On the other hand, by driving the output shaft Ma of the phase control motor M to rotate at a speed higher or lower than the rotation speed of the outer case 11, the eccentric axis Y revolves around the rotational axis X in the phase adjustment mechanism C. By this revolution, the location where the outer teeth portion 30A of the input gear 30 engages with the inner teeth portion 25A of the output gear 25 is displaced along the inner periphery of the output gear 25, and a rotational force acts between the rotational force between the input gear 30 and the output gear 25. That is, a rotational force centered on the rotational axis X acts on the output gear 25, and a rotational force acts on the input gear 30 so as to allow the input gear 30 to rotate around the eccentric axis Y.

As described above, the input gear 30 does not rotate relative to the outer case 11 because the engaging projections 30T of the input gear 30 engage with the engaging recessed portions 43a of the inner engaging arms 43 of the coupling member 40, and the rotational force acts on the output gear 25. Due to the action of this rotational force, the intermediate member 20 rotates together with the output gear 25 around the rotational axis X relative to the outer case 11. As a result, the relative rotation phase between the driving-side rotating body A and the driven-side rotating body B is set, and thus setting of the opening/closing timing by the intake camshaft 2 is realized.

Also, when the eccentric axis Y of the input gear 30 revolves around the rotational axis X, according to the displacement of the input gear 30, the coupling member 40 of the Oldham coupling Cx is displaced in the direction (the first direction) in which the outer engaging arms 42 extend relative to the outer case 11, and the input gear 30 is displaced in the direction (the second direction) that the inner engaging arms 43 extend.

As described above, the number of teeth of the outer teeth portion 30A of the input gear 30 is set to one less than the number of teeth of the inner teeth portion 25A of the output gear 25, so when the eccentric axis Y of the input gear 30 revolves by one revolution around the rotational axis X, the output gear 25 rotates by only one tooth, thereby achieving a large deceleration.

Lubrication of Phase Adjustment Mechanism

As shown in FIG. 1, a lubricating oil path 15, where lubricating oil from an external oil pump P is supplied through an oil path forming member 9, is formed in the intake camshaft 2. An opening portion 21a that guides oil to the inside of the eccentric member 26 is formed in part of the face of the support wall 21 of the intermediate member 20 that contacts the intake camshaft 2.

As described above, the plurality of first lubricating oil grooves 26a and the plurality of second lubricating oil grooves 26b are formed in the eccentric member 26 (see FIGS. 1 and 5). Also, in the face of the front plate 12 facing the coupling member 40, a lubricating recessed portion 12a is formed between that face and the surface of the coupling member 40, forming a slight gap along the radial direction. Note that, although the lubricating recessed portion 12a is formed on the side of the inner periphery of the front plate 12, the lubricating recessed portion 12a may be formed in an area reaching the outer periphery of the front plate 12, and a configuration may be adopted in which the lubricating recessed portion 12a is omitted and lubricating oil is supplied in the gap between the front plate 12 and the coupling member 40.

As described above, the pair of discharge channels 11b are formed in the guide groove portions 11a (see FIGS. 4 and 5). Furthermore, by adopting an opening diameter of the opening 12b of the front plate 12 that is sufficiently larger than the inner diameter of the eccentric member 26, a step G is formed between the opening edge of the front plate 12 and the inner periphery of the eccentric member 26.

With this configuration, the lubricating oil supplied from the oil pump P is supplied from the lubricating oil path 15 of the intake camshaft 2 to the internal space of the eccentric member 26 through the opening portion 21a of the support wall 21 of the intermediate member 20. The lubricating oil supplied in this way is supplied from the first lubricating oil grooves 26a of the eccentric member 26 to the first bearing 28 by centrifugal force to operate the first bearing 28 smoothly.

At the same time, the lubricating oil in the internal space of the eccentric member 26 is supplied from the second lubricating oil grooves 26b to the coupling member 40 by centrifugal force, and is also supplied to the second bearing 29, and is supplied between the inner teeth portion 25A of the output gear 25 and the outer teeth portion 30A of the input gear 30.

Also, as shown in FIG. 1, the lubricating oil from the second lubricating oil grooves 26b is supplied between the front plate 12 and the coupling member 40 by the lubricating recessed portion 12a, and is supplied into the gap between the outer engaging arms 42 of the coupling member 40 and the guide groove portions 11a of the outer case 11. Thus, the coupling member 40 is allowed to operate smoothly. Then, the lubricating oil supplied to the coupling member 40 is discharged to the outside from the gap between the outer engaging arms 42 of the coupling member 40 and the guide groove portions 11a of the outer case 11.

In particular, because the step G is formed between the opening edge of the front plate 12 and the inner periphery of the eccentric member 26, when the engine E is stopped, the lubricating oil in the internal space of the eccentric member 26 is discharged from the opening 12b of the front plate 12 and thus the amount of lubricating oil remaining inside can be reduced. Note that, when a large amount of lubricating oil remains inside the valve opening/closing timing control device 100, after the engine E is started in a cold environment, operation of the phase adjusting mechanism C is suppressed by the effects of viscosity of the lubricating oil. However, by discharging the lubricating oil when the engine E is stopped, such a disadvantage can be eliminated.

Also, because the discharge channel 11b is formed in the guide groove portions 11a, when starting the engine E when in a stopped state in a cold environment, the lubricating oil inside can be quickly discharged through the discharge channel 11b by centrifugal force. Therefore, the highly viscous lubricating oil can be discharged in a short time, so it is possible to eliminate the influence of viscosity of the lubricating oil, and enable the phase control mechanism C to operate quickly.

Operation and Effects of Embodiment

In this configuration, the first bearing 28 and the second bearing 29 can be disposed relatively close to each other inside the intermediate member 20, and because the coupling member 40 of the Oldham coupling Cx is configured with a plate material, in the valve opening/closing timing control device 100, it is possible to realize a more compact size in the direction along the rotational axis X.

Also, the eccentric member 26 is supported on the support face 22S on the inner periphery of the intermediate member 20 by the first bearing 28, and the input gear 30 is supported on the eccentric support face 26E of the eccentric member 26 through the second bearing 29. Therefore, even if the biasing force of the spring body 27 acts in a direction that changes the attitude of the eccentric member 26, the entire circumference of the outer face of the circumferential support face 26S of the eccentric member 26 is held surrounded by the inner periphery of the intermediate member 20 by the first bearing 28, so it is possible to maintain the positional relationship between the eccentric member 26 and the intermediate member 20.

In particular, in this configuration, the biasing force of the spring body 27 acts only between the eccentric member 26 and the intermediate member 20, and does not act on an external member. Therefore, for example, it is not necessary to consider the deformation or displacement of the external member with respect to the biasing force of the spring body 27, and the attitude of the eccentric member 26 can be even more precisely maintained.

Also, by forming the first lubricating oil grooves 26a and the second lubricating oil grooves 26b for flowing the lubricating oil at the end of the eccentric member 26, the Oldham coupling Cx is operated smoothly, the first bearing 28 and the second bearing 29 are operated smoothly, the inner teeth portion 25A of the output gear 25 and the outer teeth portion 30A of the input gear 30 are smoothly engaged, and the load that acts on the phase control motor M is reduced. By forming the first lubricating oil grooves 26a and the second lubricating oil grooves 26b in this way, the lubricating oil is supplied to locations where the lubricating oil is required, so the lubricating oil is not wasted and the amount of lubricating oil can be reduced.

In particular, by supplying lubricating oil between the coupling member 40 constituting the Oldham coupling Cx and the front plate 12, the coupling member 40 is allowed to operate smoothly, and the load that acts on the phase control motor M can be further reduced.

In the phase adjustment mechanism C, a strong force acts on the portion where the inner teeth portion 25A of the output gear 25 and the outer teeth portion 30A of the input gear 30 engage with each other, so dust may be generated at this location. However, a bearing is not disposed on the downstream side of the engaging portion in the direction that the lubricating oil flows, so it is possible to eliminate the influence of dust and the like and to suppress damage to the bearing.

In particular, in this configuration, because the lubricating oil can be discharged by centrifugal force, not only can dust and foreign matter and the like be discharged, but also the lubricating oil is positively discharged even when the engine E is stopped. Therefore, dust and foreign matter and the like are not allowed to remain inside.

Figure 6:
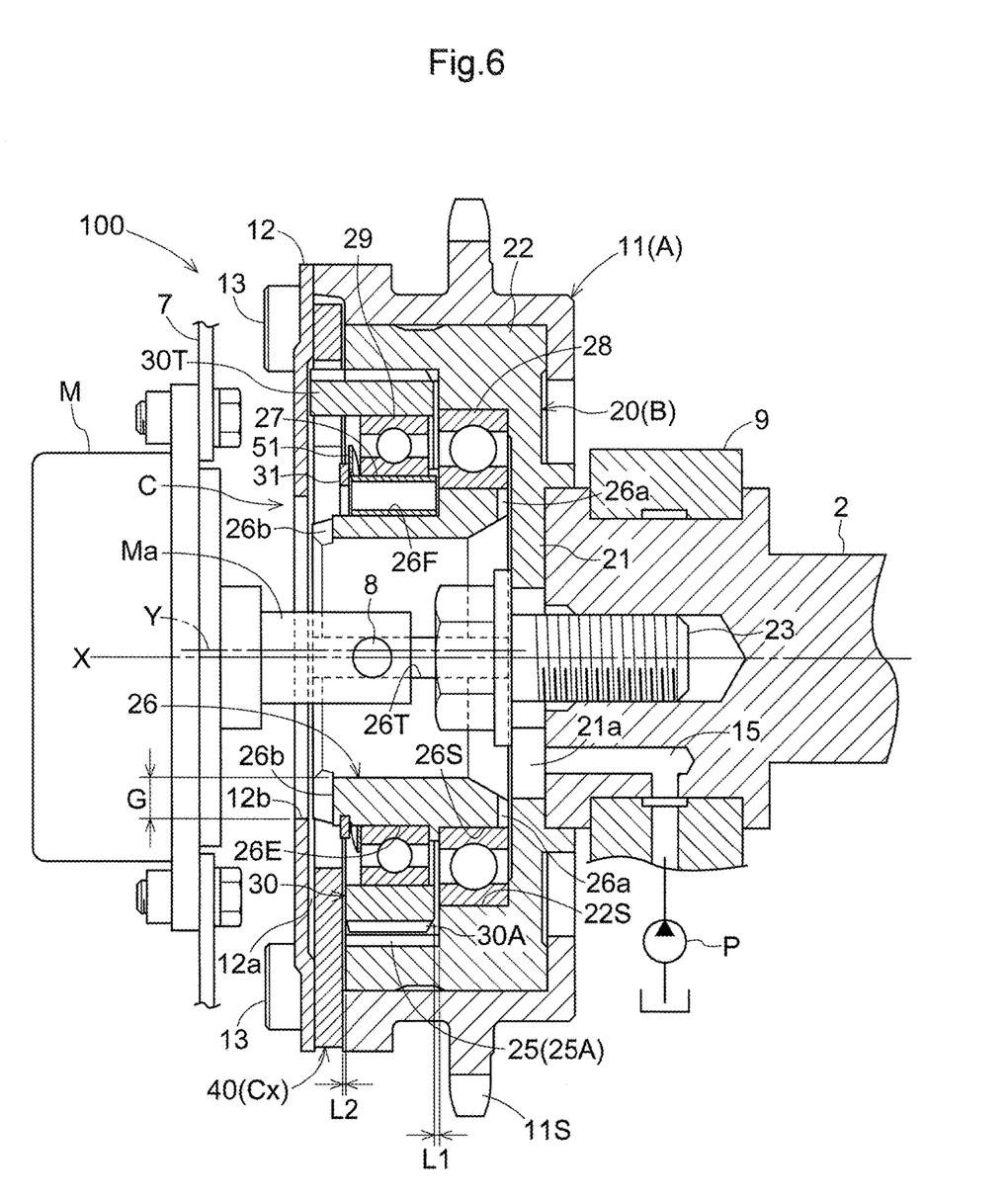
FIG. 6 is a cross-sectional view of a valve opening/closing timing control device of another embodiment.

Other Embodiments (1) In the above embodiment, the spring body 27, causing biasing force to act on the input gear 30 such that part of the outer teeth portion 30A of the input gear 30 is caused to engage with part of the inner teeth portion 25A of the output gear 25, is provided between the outer periphery side of the eccentric member 26 and the inner periphery side of the second bearing 29. Also, the Oldham coupling Cx is disposed between the front plate 12 and the second bearing 29. In the valve opening/closing timing control device 100, ordinarily, from the viewpoint of ease of assembly of the members, as shown in FIG. 6, gaps (L1 and L2) in which the input gear 30 is allowed to move in the direction along the rotational axis X are disposed. The gap L1 is formed between the input gear 30 and the first bearing 28, and the gap L2 is formed between the input gear 30 and the Oldham coupling Cx. Also, a gap in which the second bearing 29 can move in the direction along the rotational axis X is formed between the second bearing 29 and the fixing ring 31 on the side of the Oldham coupling Cx.

In such a configuration, for example, when an external force acts on the driven-side rotating body B connected to the intake camshaft 2 when torque fluctuation is applied during operation of the engine E, the external force acts from the inner teeth portion 25A of the output gear 25 to the outer teeth portion 30A of the input gear 30. In this case, the input gear 30, to which the external force has been transmitted, moves in the range of the gaps L1 and L2 in the direction along the rotational axis X, and also moves in a direction (a direction toward the rotational axis X) resisting the biasing force of the spring body 27. In addition, the second bearing 29 also moves in the range of the gaps in the direction along the rotational axis X, and moves in the direction (the direction toward the rotational axis X) resisting the biasing force of the spring body 27. In this way, because the input gear 30 and the second bearing 29 move in two directions inside the driven-side rotating body B, they may have an attitude inclined relative to the direction along the rotational axis X. When this happens, corner portions of the input gear 30 and the second bearing 29 come into contact with the peripheral members (the spring body 27, the eccentric member 26, the output gear 25, and the like), and therefore there is a risk of wear on the input gear 30 and the second bearing 29, and on the peripheral members.

Figure 7:
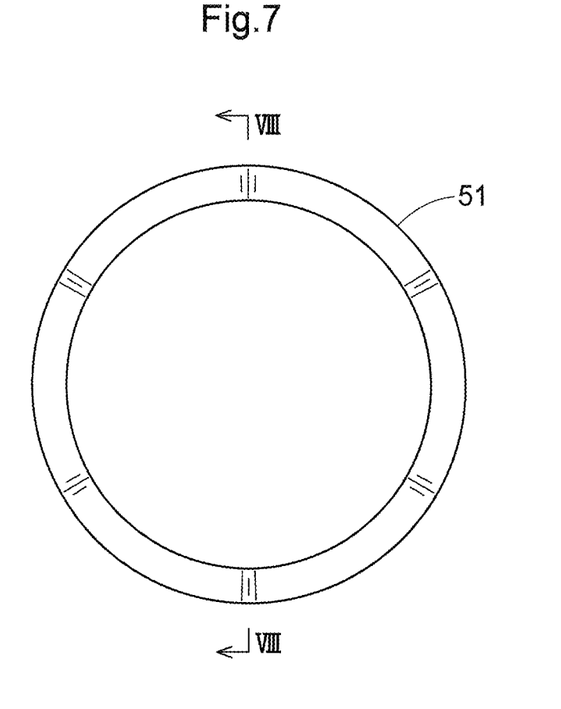
FIG. 7 is a front view of a second biasing member.
Figure 8:
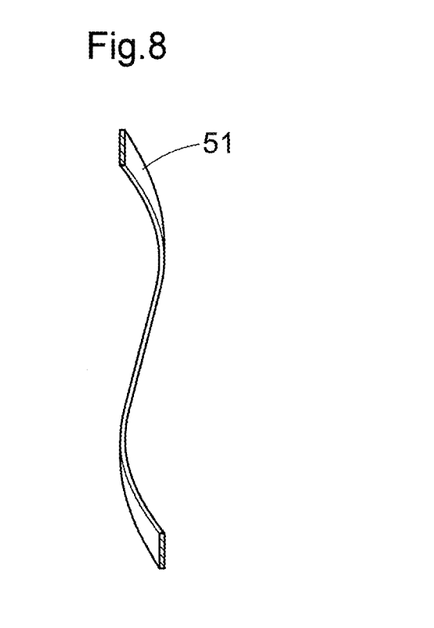
FIG. 8 is a cross-sectional view taken along line VIII-VIII in FIG. 7.

Therefore, in the embodiment shown in FIG. 6, a second biasing member 51 that biases the second bearing 29 toward the first bearing 28 is provided between the Oldham coupling Cx and the second bearing 29. In the present embodiment, the second biasing member 51 is disposed between the fixing ring 31 and the inner ring of the second bearing 29. The second biasing member 51 has an annular shape, and is configured with, for example, a wave washer shown in FIGS. 7 and 8. The second biasing member 51 is disposed at a position separated from the outer periphery of the spring body 27 so as not to restrict the movement of the spring body 27. Note that the wave washer is merely an example of the second biasing member 51. The second biasing member 51 may have another shape as long as the second biasing member 51 biases the second bearing 29 toward the first bearing 28.

With the second biasing member 51 provided between the Oldham coupling Cx and the second bearing 29, the second bearing 29 is biased toward the first bearing 28 and held on the side of the first bearing 28, and therefore the second bearing 29 is difficult to move in the direction along the rotational axis X. As a result, the position of the second bearing 29 in the direction along the rotational axis X, and the attitude of the second bearing 29, are stable. Because the input gear 30 is supported by the second bearing 29 whose position and attitude are maintained, the attitude of the input gear 30 is stable. Further, by stabilizing the position and attitude of the second bearing 29, the frictional force between the inner peripheral face of the second bearing 29 and the outer peripheral face of the eccentric member 26 is increased. As a result, when the input gear 30 and the second bearing 29 have moved in the direction (the direction toward the rotational axis X) resisting the biasing force of the spring body 27, the inner peripheral side of the second bearing 29 and the outer peripheral face of the eccentric member 26 come into face contact. Thus, by stabilizing the position and attitude of the second bearing 29, the attitude of other members that contact the second bearing 29 is stable. As a result, the input gear 30 and the second bearing 29 come into face contact with peripheral members, which makes them less likely wear, thereby improving durability.

Figure 9:
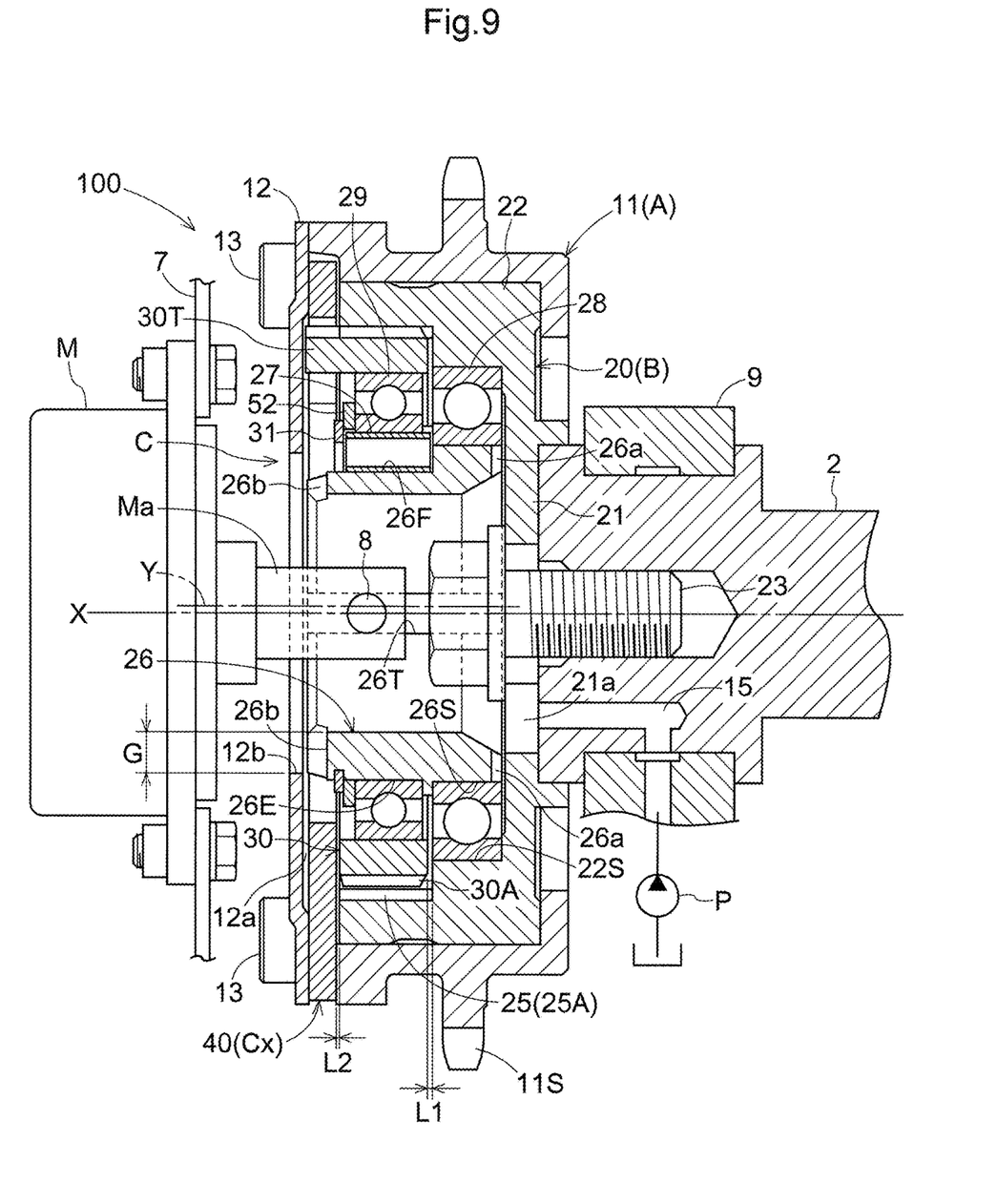
FIG. 9 is a cross-sectional view of a valve opening/closing timing control device of another embodiment.

(2) As shown in FIG. 9, instead of the second biasing member 51, a spacer 52 may be provided between the Oldham coupling Cx and the second bearing 29. In this case, the spacer 52 sets the distance of the gap in which the second bearing 29 can move in the direction along the rotational axis X to no more than a predetermined set value. By providing the spacer 52 between the Oldham coupling Cx and the second bearing 29, movement of the second bearing 29 in the direction along the rotational axis X is limited to no more than the predetermined set value. As a result, the position and attitude of the second bearing 29 in the direction along the rotational axis X become stable. Here, the distance no more than a predetermined set value preferably is, for example, a distance shorter than the total distance of the gaps L1 and L2 formed on both sides of the input gear 30, in order to stabilize the position and attitude of the second bearing 29 in the direction along the rotational axis X.

Because the input gear 30 is supported by the second bearing 29, which has small changes in position in the direction along the rotational axis X and small changes in attitude, the attitude of the input gear 30 is stabilized. Also, by stabilizing the position and attitude of the second bearing 29, the frictional force between the inner peripheral face of the second bearing 29 and the outer peripheral face of the eccentric member 26 is increased. As a result, the input gear 30 and the second bearing 29 come into face contact with peripheral members, which makes them less likely wear, thereby improving durability.

INDUSTRIAL APPLICABILITY

The present invention is applicable to a valve opening/closing timing control device that sets a relative rotation phase between a driving-side rotating body and a driven-side rotating body using a driving force of an electric actuator.

DESCRIPTION OF REFERENCE SIGNS

1: crankshaft
2: intake crankshaft (camshaft)
11b: discharge channel
12: front plate
21: support wall
22: cylindrical wall
25: output gear
26: eccentric member
26b: second lubricating oil groove (lubricating oil groove)
27: spring body (first biasing member)
28: first bearing
29: second bearing
30: input gear
51: second biasing member
52: spacer
A: driving-side rotating body
B: driven-side rotating body
C: phase adjustment mechanism
Cx: Oldham coupling
E: engine (internal combustion engine)
M: phase control motor (electric actuator)
X: rotational axis
Y: eccentric axis

The invention claimed is:

1. A valve opening/closing timing control device, comprising:
a driving-side rotating body that rotates in synchronization with a crankshaft of an internal combustion engine around a rotational axis;
a driven-side rotating body disposed inside of the driving-side rotating body on the same axis as the rotational axis, the driven-side rotating body rotating as a single body together with a valve opening/closing camshaft of the internal combustion engine; and
a phase adjustment mechanism that sets a relative rotation phase between the driving-side rotating body and the driven-side rotating body using a driving force of an electric actuator;
wherein the phase adjustment mechanism is provided with an output gear provided in the driven-side rotating body on the same axis as the rotational axis, an input gear that rotates on an eccentric axis having an attitude parallel to the rotational axis, has fewer teeth than the output gear, and is disposed on the same axis as the eccentric axis, the input gear configured to couple to the driving-side rotating body through an Oldham coupling, and a cylindrically-shaped eccentric member that supports the input gear inside of the input gear so as to allow the input gear to rotate around the eccentric axis, the phase adjustment mechanism thereby changing a position where the output gear and the input gear engage with each other by causing the eccentric axis to revolve with rotation of the eccentric member due to driving force of the electric actuator, and the valve opening/closing timing control device is provided with a first bearing disposed between an inner periphery of the driven-side rotating body and an outer periphery of the eccentric member, a second bearing disposed between the outer periphery of the eccentric member and the inner periphery of the input gear on a side of the first bearing away from the camshaft in a direction along the rotational axis, and a front plate fixed to the driving-side rotating body on a side of the second bearing away from the camshaft in the direction along the rotational axis, the Oldham coupling being disposed on the side away from the camshaft of both the first bearing and the second bearing in the direction along the rotational axis.

2. The valve opening/closing timing control device according to claim 1,
wherein the Oldham coupling is disposed between the front plate and the second bearing, and
in the eccentric member, a lubricating oil groove that guides lubricating oil supplied to an internal space to the outside in the radial direction is formed inside relative to the front plate, at an end on the side away from the camshaft in the direction along the rotational axis.

3. The valve opening/closing timing control device according to claim 1,
wherein the Oldham coupling is disposed between the front plate and the second bearing, and
a notch-like discharge channel that allows lubricating oil to flow through to the side of the outer periphery at the location where the Oldham coupling engages is formed in the driving-side rotating body.

4. The valve opening/closing timing control device according to claim 1, comprising:
a first biasing member, causing biasing force to act on the input gear such that part of the input gear engages with part of the output gear, provided between the outer periphery side of the eccentric member and the inner periphery side of the second bearing;
wherein the Oldham coupling is disposed between the front plate and the second bearing, and
a second biasing member that biases the second bearing toward the first bearing is provided between the Oldham coupling and the second bearing.

5. The valve opening/closing timing control device according to claim 1, comprising:
a first biasing member, causing biasing force to act on the input gear such that part of the input gear engages with part of the output gear, provided between the outer periphery side of the eccentric member and the inner periphery side of the second bearing;
wherein the Oldham coupling is disposed between the front plate and the second bearing, and
a spacer, which sets a distance of a gap in which the second bearing can move in the direction along the rotational axis to no more than a predetermined set value, is provided between the Oldham coupling and the second bearing.

* * * * *